United States Patent Office 3,371,330
Patented Feb. 27, 1968

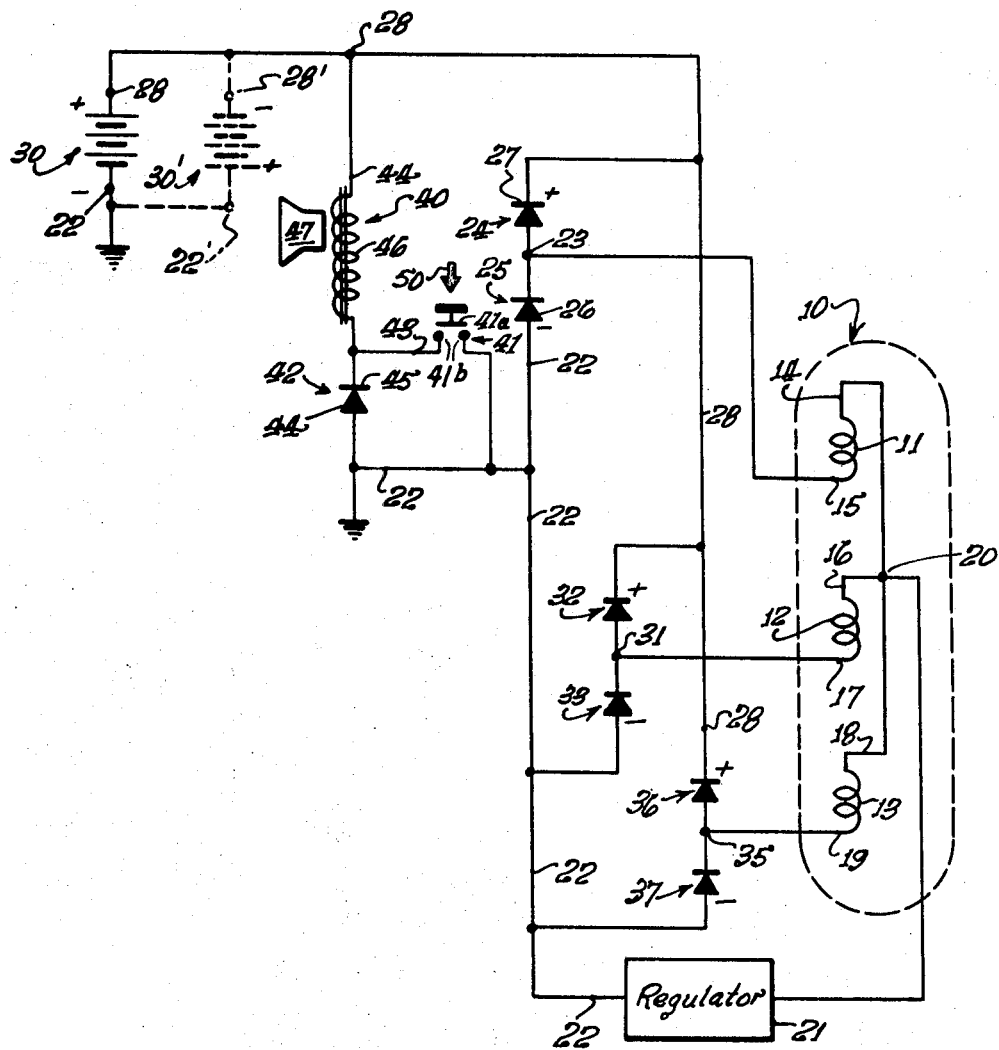

3,371,330
POLARITY REVERSAL WARNING DEVICE
Samuel Dale Howard, Hawthorne, Billy D. Gray, Torrance, and Howard G. Corlett, Gardena, Calif., assignors to Handebois, Inc., Hawthorne, Calif., a corporation of California
Filed Jan. 18, 1965, Ser. No. 426,064
2 Claims. (Cl. 340—249)

ABSTRACT OF THE DISCLOSURE

This invention relates to automotive electrical systems employing an alternator as the current operating source and, more particularly, to an alarm circuit to warn of the insertion of a battery therein with reversed polarity. In such alternator circuits it is possible to burn out the diode associated with the alternator circuit by improperly reconnecting the system such that the positive terminal is connected to the negative terminal of the battery and vice-versa after a replacement has been made. The provision of a diode between ground and the junction of the relay coil and the horn in an automobile prevents the burning out of the diodes ordinarily associated with the alternator.

Background of the invention

This invention relates to automotive electrical systems and more particularly to an alarm circuit to warn of the insertion of a battery therein with reversed polarity.

Automotive eletctrical systems in present day automobiles increasingly employ alternators, the rotors of which are propelled by the engine and the output of which is applied to diode rectifier elements for charging the automobile storage battery.

If there should be an inadvertent reversal in the polarity of the battery or of a battery charger when connecting it to the alternator system, there has been no effective and simple means to warn that this error in connection has occurred before the alternator windings are seriously damaged or destroyed.

This invention contemplates a relatively simple and effective circuit means for automobile electrical systems whereby a polarity reversal in storage battery or charger connections will immediately sound the automobile horn thereby warning that the connection error has been made. Upon such a warning the battery or charger may be immediately disconnected and properly reconnected.

The danger of the improper polarity connection of a battery or charger with an alternator type of electrical generator for automobiles is that there will result forward conduction through the alternator rectifier diodes and alternator coils to cause them to burn out.

Accordingly, it is an object of this invention to provide an alarm circuit for automotive alternator electrical circuits to warn of the incorrect polarity in connecting batteries or chargers thereto.

It is a further object of this invention to provide in an automotive alternator electrical system a warning alarm circuit wherein a diode in parallel with the automobile horn switch will be conductive to apply energy to the horn when a storage battery or charger is connected in the circuit in reverse polarity.

These and other objects of this invention will become more clear from the specification which follows wherein a preferred embodiment of the invention is described and shown in the accompanying drawing.

The novel features which are believed to be characteristic of the present invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

The invention is particularly applicable to automobiles and is therefore described in connection therewith, utilizing as an example a battery connection. It is to be expressly recognized that the invention is equally applicable, when used in any electrical system having an alternator, for protection against improper polarity connections from batteries, battery chargers, power supplies, and the like.

In the drawing there is shown a circuit diagram of an implementation of this invention as applied to an alternator electrical generating system in an automotive vehicle.

Referring to the drawing, an alternator/generator 10 is shown enclosed in a dashed line outline within which are the generator output coils 11, 12, and 13 thereof. The remaining components of alternator/generator 10 are not shown. One end, 14, 16, 18 of each of coils 11, 12, 13 is connected together to a common point 20. Common circuit point 20 may be connected through the alternator/generator regulator system shown as box 21 to ground return 22. Alternatively, common point 20 may be connected to ground return directly.

The other lead 15 of coil 11 of alternator/generator 10 is connected to the junction 23 of a pair of diodes 24, 25 connected in series. The anode 26 of diode 25 is connected to ground return 22. The cathode 27 of diode 24 is connected to the normally positive line 28 of a storage battery 30. The normally negative terminal of storage battery 30 is connected to ground return 22.

Similarly, the other lead 17 of coil 12 of alternator/generator 10 is connected to the junction 31 of series connected diodes 32, 33 between positive line 28 and ground return 22 in the same polarity as diodes 24, 25.

Also similarly the other lead 19 of coil 13 of alternator/generator 10 is connected to the junction 35 of a pair of diodes 36, 37 connected in series between positive line 28 and ground return 22 in the same polarity as diodes 24, 25.

An automotive horn 40 is shown here for simplicity as comprising a coil element 46 having terminals 43 and 44 and a sounder 47, but horn 40 may be any one of a variety of similar horn devices having other configurations. Terminal 44 of horn coil 46 is connected to positive line 28. Terminal 43 of coil 46 is connected to the cathode 45 of a diode 42 and to normally open movable switch contact 41a of a horn switch 41. The anode 44 of diode 42 is connected to ground return 22 as is fixed terminal 41b of horn switch 41.

Battery 30 has been shown in dashed line as battery 30' with polarity reversed so that negative terminal thereof is 28' connected to line 28 and poistive terminal 22' thereof connected to ground return 22.

The normal operation of the circuit shown herein may be best described as follows:

When alternator/generator 10 is operated in the usual fashion of such apparatus by the rotation of the rotor thereof with the engine of an automobile in which it may be installed, the coils 11, 12, 13 will have induced therein alternating currents which will be rectified by rectifier pairs 24–25, 32–33, and 36–37 to produce a D-C potential between lines 28 and ground return 22 with the polarity positive at line 28 and negative at ground return 22, so that battery 30 may be charged thereby since battery 30 is connected with its positive terminal (+) to line 28 and negative terminal (—) to ground return 22. This is the proper and normal polarity termination of a storage battery such as 30 in a circuit configuration such as shown in the drawing and described hereinabove.

According to this invention diode 42 is normally connected to be non-conductive as shown, in series with coil 46 so that when battery 30 is normally connected with positive (+) pole to line 28 the only way in which horn 40 can be energized to produce a sound from sounder 47 is for pressure to be applied, as shown by arrow 50, on horn switch 41 to close contacts 41a and 41b. The circuit through coil 46 is thereby completed and horn 40 will sound through sounder 47.

However by means of diode 42 connected as shown and described above, should battery 30 be improperly connected, as indicated in the dashed line configuration 30; with positive 22' (+) to ground 22 and negative 28' (—) to positive line 28, then diode 42 will be conductive since now anode 44 is positive with respect to cathode 45 and the circuit of coil 46 is completed between line 28 and ground lead 22 to sound horn 40 through sounder 47. Thus, in the event of such an improper connection of battery 30 in the manner shown at 30', horn sounder 47 will be energized and the battery installer warned by the noise that a polarity error has been made. He will then immediately disconnect the battery before any continuing damage can occur.

The reason that damage can result to the windings or coils 11, 12, 13 when battery 30 is connected in reversed polarity as at 30' is the following:

With line 28 negative instead of positive, diodes 24-25, 32-33, and 36-37 will be conductive so that the full battery potential will be across them and coils 11, 12, 13 will also be across battery 30' through diodes 24, 32, 36 respectively and regulator 21 if such a regulator is in the circuit.

By the use of a diode 42 as set forth hereinabove the sounding of an alarm warns the battery installer of the incorrect polarity of the battery connection and he may correct the error before damaging the diodes or coils.

What is claimed is:
1. An alarm system for warning of the improper polarity of connection of a battery in an automotive electrical system comprising in combination:
   a horn having a driving coil therefore having two ends, one end of said driving coil being connected to the normally positive circuit terminal of said automotive electrical system;
   a normally open push button switch having a fixed contact and a movable contact, said fixed contact thereof being connected to the normally negative circuit terminal of said electrical system, said movable contact being connected to the other end of said driving coil so that said horn may be sounded normally when said movable contact is closed against said fixed contact; and
   a diode having an anode and a cathode, said anode being connected to said fixed terminal of said push button switch, said cathode being connected to said movable contact of said push button switch;
   whereby when a battery is connected normally in said electrical system said diode will be non-conductive and said horn will not be energized unless said push button switch is actuated, but when a battery is connected so that the polarity thereof is reversed and the positive terminal of said battery connected to the normally negative terminal of said system and the negative terminal of said battery connected to the normally positive terminal of said system, said diode will be conductive and complete the circuit through said driving coil to energize said horn which will sound to warn that the improper connection polarity of the battery has been made.

2. An alarm system for warning of the improper polarity of connection of a power source in an electrical system comprising in combination:
   an alarm device having a driving coil therefore having two ends, one end of said driving coil being connected to the normally positive circiut terminal of said electrical system;
   a normally open switch having a fixed contact and a movable contact, said fixed contact thereof being connected to the normally negative circuit terminal of said electrical system, said movable contact being connected to the other end of said driving coil so that said alarm device may be actuated normally when said movable contact is closed against said fixed contact; and,
   a diode having an anode and a cathode, said anode being connected to said fixed terminal of said switch, said cathode being connected to said movable contact of said switch;
   whereby when a power source is connected normally in said electrical system said diode will be non-conductive and said alarm device will not be energized unless said switch is actuated, but when a power source is connected so that the polarity thereof is reversed and the positive terminal of said power source connected to the normally negative terminal of said system and the negative terminal of said power source connected to the normally positive terminal of said system, said diode will be conductive and complete the circuit through said driving coil to energize said alarm device to warn that the improper connection polarity of the power source has been made.

References Cited

UNITED STATES PATENTS 3,307,097   2/1967   Brewster _____ 317—43 X

THOMAS B. HABECKER, *Acting Primary Examiner.*

NEIL C. READ, *Examiner.*

D. MYER, *Assistant Examiner.*